United States Patent
Chung et al.

(10) Patent No.: US 8,550,729 B2
(45) Date of Patent: Oct. 8, 2013

(54) SHUTTER DEVICE AND IMAGE CAPTURING APPARATUS HAVING THE SAME

(75) Inventors: Hae-in Chung, Uijeongbu-si (KR); Jin-won Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 29 days.

(21) Appl. No.: 13/196,442

(22) Filed: Aug. 2, 2011

(65) Prior Publication Data

US 2012/0033961 A1 Feb. 9, 2012

(30) Foreign Application Priority Data

Aug. 5, 2010 (KR) .......................... 10-2010-0075657

(51) Int. Cl.
*G03B 9/02* (2006.01)
(52) U.S. Cl.
USPC ........................................................... 396/463
(58) Field of Classification Search
USPC ........................................................... 396/463
See application file for complete search history.

(56) References Cited

U.S. PATENT DOCUMENTS

| | | | | |
|---|---|---|---|---|
| 4,458,998 A | * | 7/1984 | Tanaka et al. ................. | 396/355 |
| 4,657,366 A |   | 4/1987 | Tanabe et al. | |
| 5,258,797 A | * | 11/1993 | Oyoshi et al. ................. | 396/132 |
| 5,392,085 A | * | 2/1995 | Tanabe ........................... | 396/490 |
| 6,726,379 B2 |   | 4/2004 | Watabe et al. | |
| 6,749,348 B2 | * | 6/2004 | Seita ............................... | 396/443 |
| 6,821,033 B2 |   | 11/2004 | Sekizawa et al. | |
| 7,692,716 B2 | * | 4/2010 | Wakabayashi ................ | 348/362 |
| 7,699,545 B2 | * | 4/2010 | Namai ........................... | 396/493 |
| 2005/0110896 A1 |   | 5/2005 | Wakabayashi | |
| 2011/0299846 A1 | * | 12/2011 | Weisbach et al. ............. | 396/453 |

FOREIGN PATENT DOCUMENTS

| | | |
|---|---|---|
| JP | 2003005252 | 1/2003 |
| JP | 2004177693 | 6/2004 |
| JP | 2005-017895 | 1/2005 |
| JP | 2006-337654 | 12/2006 |
| JP | 2005091656 | 5/2009 |

* cited by examiner

*Primary Examiner* — Rodney Fuller

(74) *Attorney, Agent, or Firm* — The Farrell Law Firm, P.C.

(57) ABSTRACT

A shutter device and an image capturing apparatus including the shutter device are provided. The shutter device includes at least one shutter blade assembly, each of the at least one shutter blade assembly including at least one shutter blade that opens and closes the shutter opening and a driving link that drives the shutter blades, and at least one actuators for rotating the driving link, wherein a rotation center of the actuator is eccentric from a rotation center of the driving link.

18 Claims, 8 Drawing Sheets

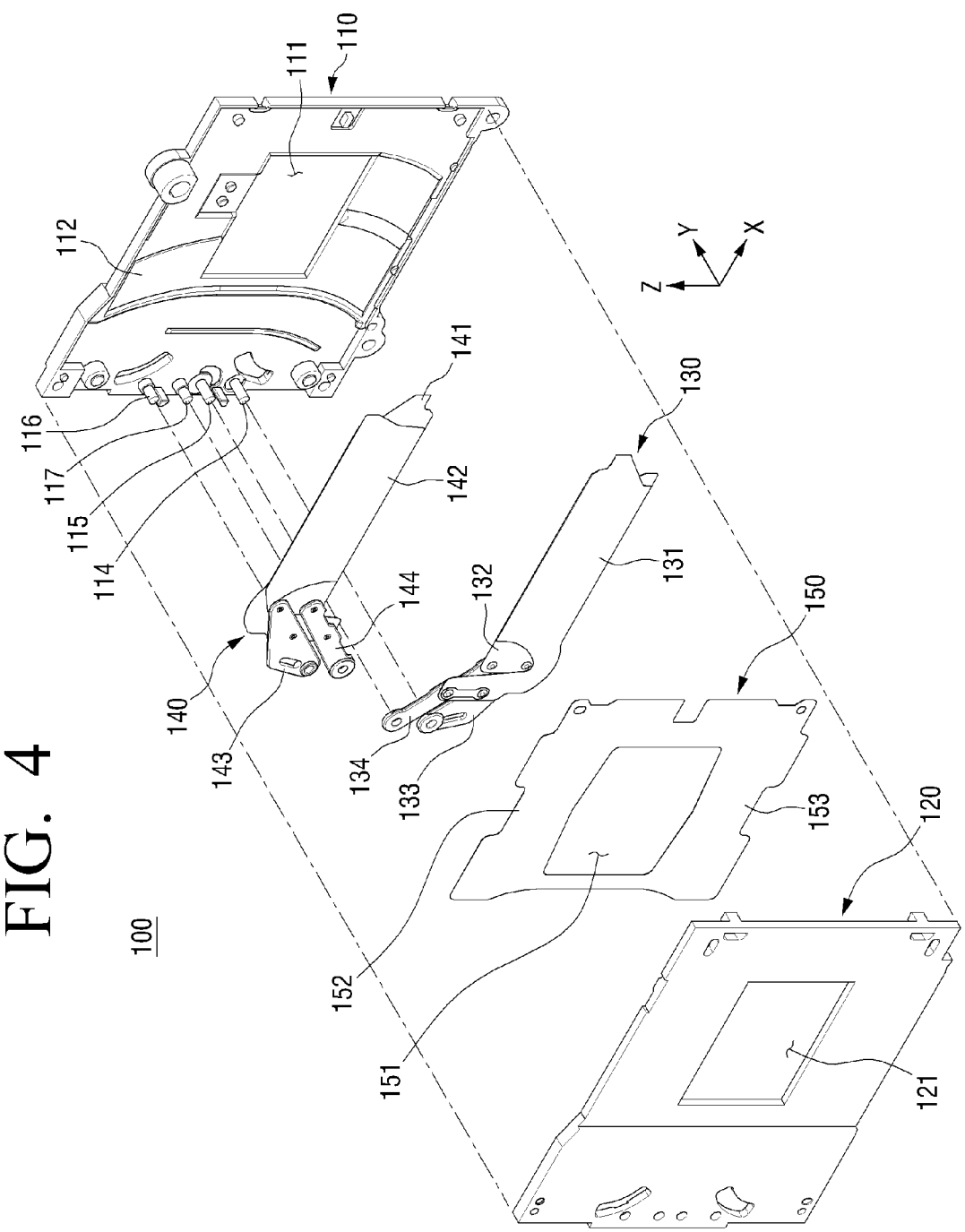

SHUTTER DEVICE AND IMAGE CAPTURING APPARATUS HAVING THE SAME

PRIORITY

This application claims priority under 35 U.S.C. §119(a) to a Korean Patent Application No. 10-2010-0075657, filed on Aug. 5, 2010, in the Korean Intellectual Property Office, the content of which is incorporated herein by reference in its entirety.

BACKGROUND

1. Field of the Invention

The present invention relates generally to a shutter device and an image capturing apparatus having the same, and more particularly, to a focal plane shutter type shutter device and an image capturing apparatus having the same.

2. Description of the Related Art

An image capturing apparatus such as a camera typically includes a shutter device for controlling a degree of exposure of an image pick-up device such as an image sensor. A Focal Plane Shutter (FPS) is a shutter device that closes and opens a shutter by driving a front blade and a rear blade. The FPS may include an actuator that drives the front and rear shutter blades. The actuator provides various advantages such as a fast response, independent controllability of the front and rear blades, etc.

In order to properly operate the shutter blades, the traveling speed of the shutter blades must be maintained above a predetermined speed while the actuator consumes the power corresponding to the traveling speed. However, as the power consumption of the actuator increases, stability of power supply to other systems within a corresponding camera may be weakened. As a result, an operable time of the camera may be decreased, and a resulting increase of heat generated in the shutter device may negatively affect other systems adjacent to the shutter device.

Therefore, there is a need to reduce power consumption of the actuator, while ensuring an appropriate traveling speed of the shutter blades.

Shutter blades are also relatively thin are formed of a relatively flexible material. Thus, deformation such as bending may be generated in the shutter blades due to factors such as gravity. The deformation of the shutter blades may deteriorate accuracy of operation of the shutter blades and thus, performance of the shutter device may be degraded.

Therefore, there is also a need for a solution that minimizes deformation of the shutter blades.

SUMMARY OF THE INVENTION

An aspect of the present invention is to substantially solve at least the above problems and/or disadvantages and to provide at least the advantages below.

One object of the present invention is to provide a shutter device and an image capturing apparatus having the same, in order to reduce power consumption of an actuator for driving the shutter device included in the image capturing apparatus.

Another object of the present invention is to provide a shutter device and an image capturing apparatus having the same, in order to minimize deformation of shutter blades included in the shutter device of the image capturing apparatus.

According to an aspect of the present invention, a shutter device is provided. The shutter device includes a shutter opening through which an incident light passes; at least one shutter blade assembly, each of the at least one shutter blade assembly including at least one shutter blade that opens and closes the shutter opening and a driving link that drives the shutter blades; and at least one actuator for rotating the driving link, wherein a rotation center of the actuator is eccentric from a rotation center of the driving link.

According to another aspect of the present invention, an image capturing apparatus is provided. The image capturing apparatus includes an image pick-up device; and a shutter device having a shutter opening through which light passes toward the image pick-up device. The shutter device includes at least one shutter blade assembly, each shutter blade assembly including at least one shutter blade that opens and closes the shutter opening and a driving link that drives the shutter blades; and at least one actuator for rotating the driving link. A rotation center of the actuator is eccentric from a rotation center of the driving link.

According to another aspect of the present invention, shutter device is provided. The shutter device includes a shutter opening through which an incident light passes; at least one shutter blade that opens and closes the shutter opening; a driving link on which the at least one shutter blade is mounted for driving the at least one shutter blade; a follower link on which the at least one shutter blade is mounted and which supports the at least one shutter blade together with the driving link; and an assistant link coupled between the driving link and the follower link.

According to another aspect of the present invention, a shutter device is provided. The shutter device includes a shutter opening through which an incident light passes; a first shutter blade assembly including at least one front blade for opening and closing the shutter opening; a second shutter blade assembly including at least one rear blade for opening and closing the shutter opening; and a separation plate for separating the first shutter blade assembly from the second shutter blade assembly, wherein the separation plate may be inclined relative to a plane in which the front blades and the rear blades are disposed.

BRIEF DESCRIPTION OF THE DRAWINGS

The above and other objects, features, and advantages of the present invention will be more clearly understood from the following detailed description taken in conjunction with the accompanying drawings, in which:

FIG. 4 is a diagram illustrating a partially exploded perspective view of the shutter device of FIG. 2;

FIGS. 5A to 5B are diagrams illustrating an inclined arrangement of a separation plate included in the shutter device of FIG. 2, wherein FIG. 5A is a schematic cross-sectional view showing an arrangement of a separation plate in the related art and FIG. 5B is a schematic cross-sectional view showing an arrangement of a separation plate according to an embodiment of the present invention;

FIGS. 8A and 8B are graphs illustrating simulation results for checking a driving efficiency of an actuator, wherein FIG. 8A is a graph showing a result when an actuator in the related art is applied and FIG. 8B is a graph showing a result when applying an actuator according to an embodiment of the present invention.

DETAILED DESCRIPTION OF EMBODIMENTS OF THE PRESENT INVENTION

Figure 1:
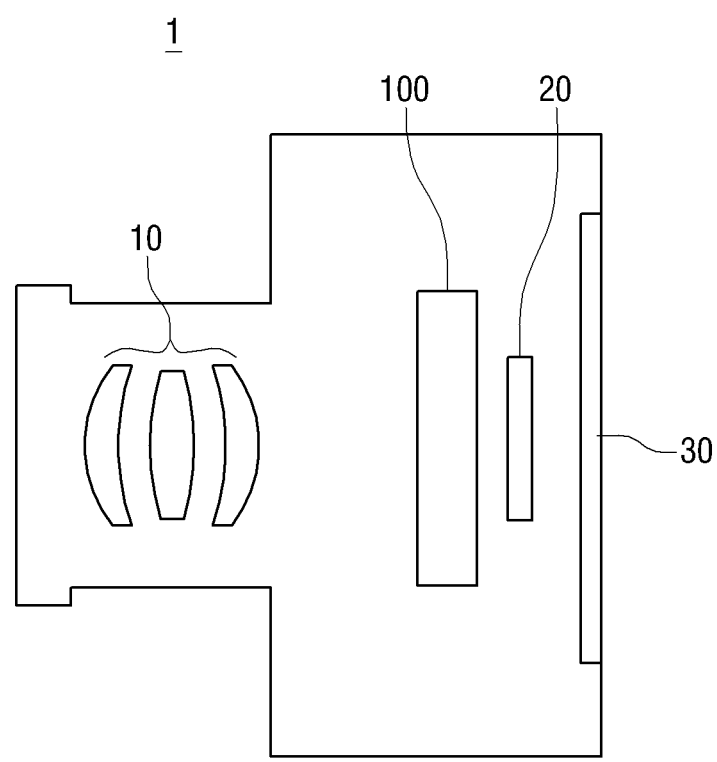
FIG. 1 is a diagram illustrating a schematic cross-sectional view of an image capturing system according to an embodiment of the present invention.

Hereinafter, embodiments are described in greater detail with reference to the accompanying drawings.

In the following description, same reference numerals are used for the same elements when they are depicted in different drawings. The matters defined in the description, such as detailed construction and elements, are provided to assist in a comprehensive understanding of embodiments of the present invention. Thus, embodiments of the present invention can be carried out with or without some of those specifically defined matters. Well-known functions or elements may not be described in detail in order to avoid obscuring the subject matter of the present invention with unnecessary detail.

FIG. 1 is a diagram illustrating a schematic cross-sectional view of an image capturing apparatus according to an embodiment of the present invention. Referring to FIG. 1, the image capturing apparatus 1 includes a photographing lens unit 10, a shutter device 100, an image pick-up device 20, and a display 30.

The photographing lens unit 10 may include a plurality of photographing lenses. The photographing lenses may focus incident light from an object to be photographed onto the image pick-up device 20. The shutter device 100, which is arranged between the photographing lens unit 10 and the image pick-up device 20, controls an appropriate amount of light incident to the image pick-up device 20. The image pick-up device 20 converts the incident light into an electric signal for generating an image. A Charge Coupled Device (CCD) sensor or a Complementary Metal Oxide Semiconductor (CMOS) image sensor may be applied as the image pick-up device 20. The display 30 displays a menu screen or an image captured by the image pick-up device 20. The image capturing apparatus 1 may further include other parts not shown in FIG. 1 for conciseness.

Figure 2:
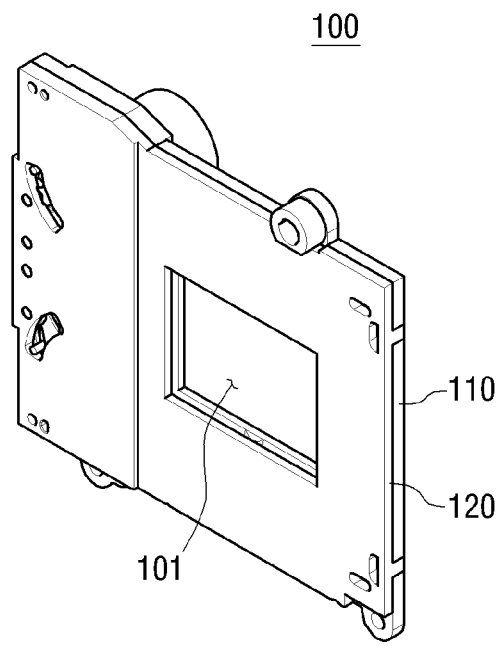
FIG. 2 is a diagram illustrating a perspective of a shutter device included in the image capturing apparatus of FIG. 1.
Figure 3:
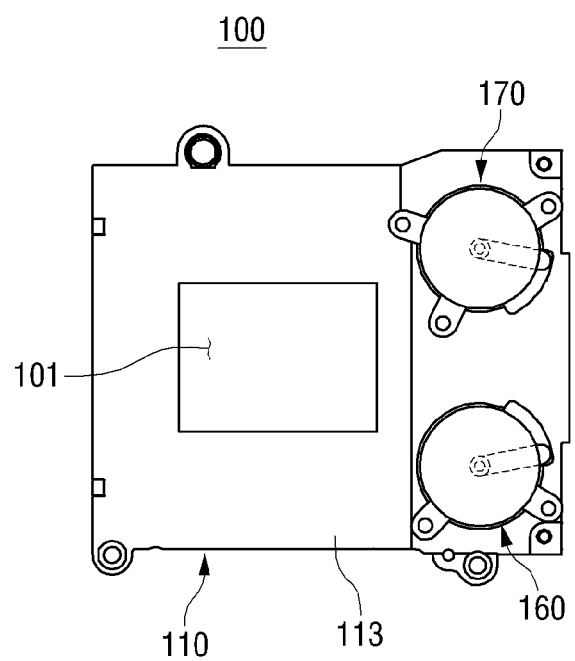
FIG. 3 is a diagram illustrating a rear view of the shutter device of FIG. 2.

FIG. 2 is a diagram illustrating a perspective view of the shutter device 100 of FIG. 1, FIG. 3 is a diagram illustrating rear view of the shutter device 100, FIG. 4 is a diagram illustrating a partially exploded perspective view of the shutter device 100 according to an embodiment of the present invention.

Referring to FIGS. 2 to 4, the shutter device 100 includes a shutter opening 101 through which an incident light passes. The shutter device 100 further includes a base frame 110, a cover frame 120, a first shutter blade assembly 130, a second shutter blade assembly 140, a separation plate 150, a first actuator 160, and a second actuator 170.

The base frame 110 and the cover frame 120 are mutually coupled each other to form a joint frame occupying an inner space of the shutter device 100. An opening 111 constituting a portion of the shutter opening 101 is formed in the base frame 110 and an opening 121 constituting a portion of the shutter opening 101 is also formed in the cover frame 120. In an inner surface 112 of the base frame 110, two bosses (i.e., first and second bosses 114 and 115) for installing the first shutter blade assembly 130 are formed to protrude from the base frame 110, and two other bosses (i.e., third and fourth bosses 116 and 117) for installing the second shutter blade assembly 140 are formed to protrude from the base frame 110.

The first and second shutter blade assemblies 130 and 140 are contained in the inner space of the shutter device 100. As shown in FIG. 4, the first shutter blade assembly 130 is disposed on a lower portion of the inner surface 112 of the base frame 110 and the second shutter blade assembly 140 is disposed on an upper portion of the inner surface 112 of the base frame 110. The shutter blade assembly 130 includes two sheets of shutter blades 131 and 132, which are called front blades, and the second shutter blade assembly 140 includes two sheets of shutter blades 141 and 142, which are called rear blades. The four sheets of shutter blades 131, 132, 141, and 142 open and close the shutter opening 101 while making translation motions along a height of the shutter opening 101 (i.e., in a Z-axis direction).

In this embodiment of the present invention, two sheets of the front blades and two sheets of the rear blades are included. However, in another embodiment of the present invention, only one sheet of each of the front blade and the rear blade may be included. In this embodiment of the present invention, the shutter blades 131, 132, 141, and 142 make translation motions. However, in another embodiment of the present invention, the shutter blades 131, 132, 141, and 142 may rotate. However, in the present example, the shutter blades 131, 132, 141, and 142 make translation motions along the height of the shutter opening 101. However, in another embodiment of the present invention, the shutter blades 131, 132, 141, and 142 may make translation motions along a width of the shutter opening 101 (i.e., in an X-axis direction).

Although not limited to such a configuration, in the present example, the first shutter blade assembly 130 has the same configuration as the second shutter blade assembly 140. More specifically, the first shutter blade assembly 130 and the second shutter blade assembly 140 include the same components and have the same coupling structure of the components, where the second shutter blade assembly 140 has an arrangement that the first shutter blade assembly 130 is 180° rotated on the X-axis. The first and second shutter blades assemblies 130 and 140 are described in more detail herein below.

The first actuator 160 and the second actuator 170 are mounted on a rear surface 113 of the base frame 110. The first actuator 160 drives the first shutter blade assembly 130 and the second actuator 170 drives the second shutter blade assembly 140. The actuators 160 and 170 are included as Voice Coil Motors (VCMs). Therefore, the first and second actuators 160 and 170 are driven such that a rotary force is generated in the rotor when a current is applied to coils. The first actuator 160 and the second actuator 170 operate independently and can be independently controlled.

The separation plate 150 separates the first shutter blade assembly 130 from the second shutter blade assembly 140. The separation plate 150 is contained in the inner space of the shutter device 100 and an opening 151 forming a portion of the shutter opening 101 is formed in a center of the separation plate 150. The separation plate 150 may prevent the front blades 131 and 132 of the first shutter blade assembly 130 and the rear blades 141 and 142 of the second shutter blade assembly 140 from interfering with each other during movement. As shown in FIG. 4, the separation plate 150 is substantially vertically oriented (i.e., parallel to an X-Z plane). However, more accurately, a top of the separation plate 150 is minutely biased toward the base frame 110 (i.e., minutely biased in the Y-direction) as compared with a bottom thereof. In other words, the separation plate 150 is arranged to be slightly (approximately 0.1°) inclined to a plane (i.e., an X-Y plane) in which the shutter blades 131, 132, 141, and 142 are arranged.

An inclined orientation of the separation plate 150 is described in more detail with reference to FIGS. 5A and 5B.

Figure 5A:
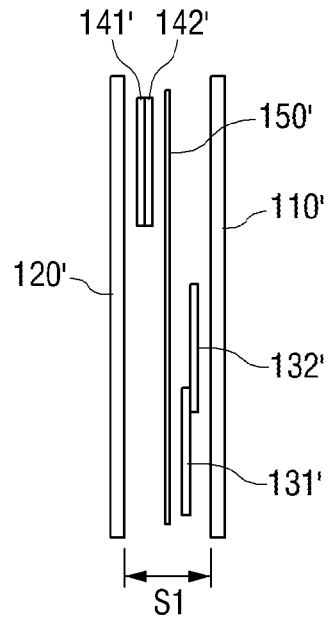
Figure 5B:
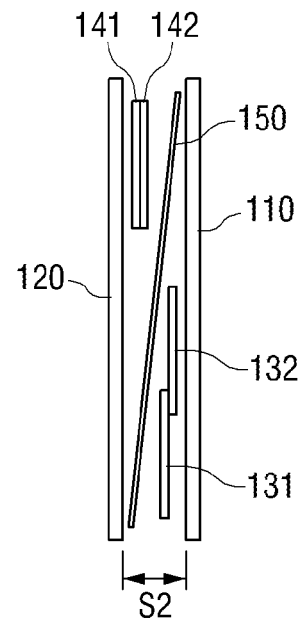

FIGS. 5A and 5B are diagrams illustrating the inclined orientation of the separation plate 150, wherein FIG. 5A is a schematic cross-sectional diagram illustrating a conventional arrangement of a separation plate. FIG. 5B is a schematic cross-sectional diagram illustrating an arrangement of the separation plate according to an embodiment of the present invention. In FIG. 5B, the degree of the incline of the separation plate exaggerated for convenience of description.

As shown in FIG. 5A, a conventional separation plate 150' is disposed parallel to a base frame 110' and a cover frame 120'. A distance between the base frame 110' and the cover frame 120' is denoted as S1. In the example according to FIG. 5Bn, the separation plate 150 is inclined towards the base frame 110 and the cover frame 120. A distance between the base frame 110 and the cover frame 120 is denoted as S2. It is seen from the comparison between FIGS. 5A and 5B that the distance S2 between the base frame 110 and the cover frame 120 in this embodiment of the present invention is less than the distance Si between the base frame 110' and the cover frame 120' in the related art (S2<S1). Although the distance between the base frame and the cover frame is designed less than the conventional distance, since the separation plate 150 is inclined, a spatial limitation for motions of the front blades 131 and 132 and the rear blades 141 and 142 does not occur.

Since the distance between the base frame 110 and the cover frame 120 is less than the conventional distance, the probability of deformation of the shutter blades 131, 132, 141, and 142 can be reduced. For example, if the shutter device 100 of this embodiment of the present invention is horizontally disposed (that is, parallel to the X-Y plane), deformation such as bending may be generated in the shutter blades 131, 132, 141, and 142 by vertical gravitational forces (i.e., a gravitational force in the Z direction). In this embodiment of the present invention, since the distance between the base frame 110 and the cover frame 120 is less than the conventional distance, deformation due to gravity can be reduced. Thus, accuracy of shutter operation in this embodiment of the present invention is greater than conventional accuracy.

Hereinafter, the above-described first shutter blade assembly 130 and second shutter blade assembly 140 are described in further detail with reference to FIGS. 6 and 7. As described above, the first shutter blade assembly 130 has the same structure as the second shutter blade assembly 140 and thus, the first shutter blade assembly 130 will be described as representative for both the first and second shutter blade assemblies 130 and 140.

Figure 6:
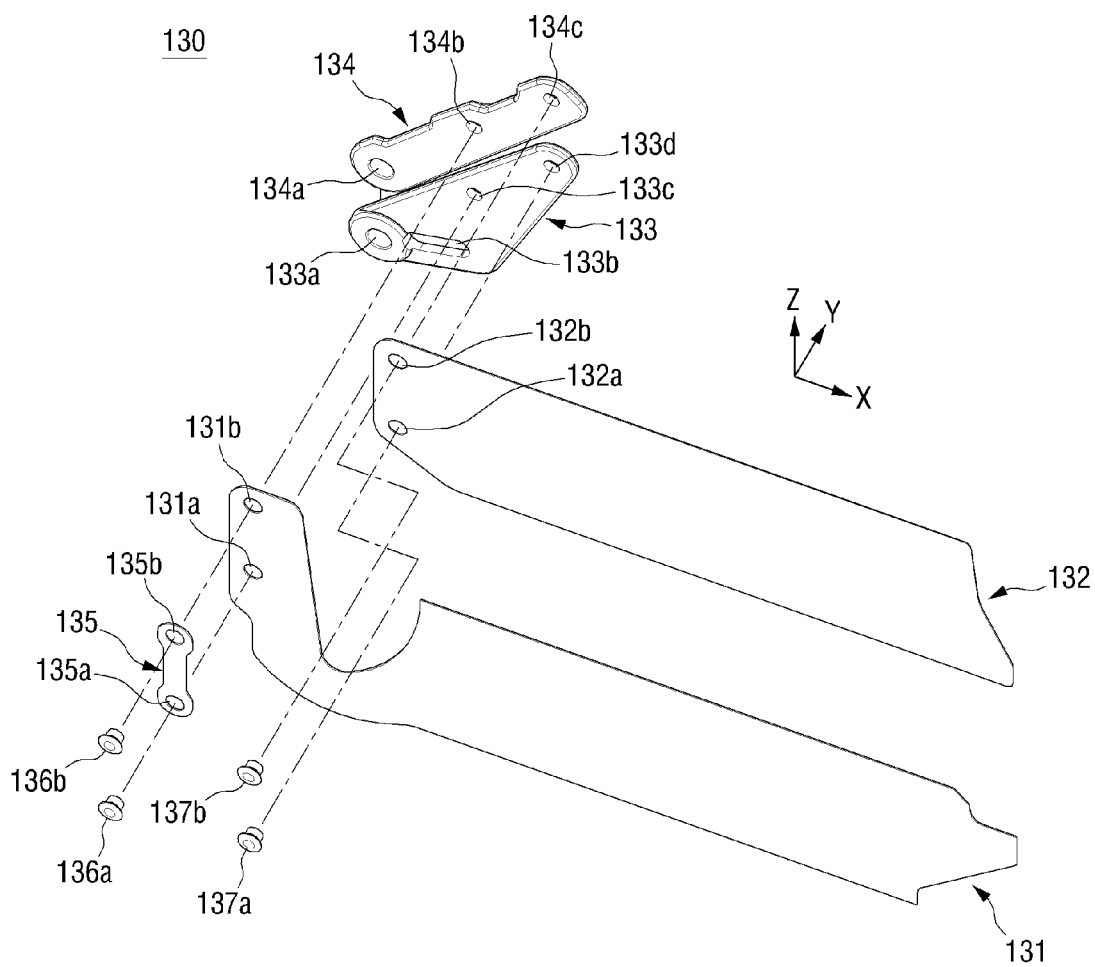
FIG. 6 is diagram illustrating an exploded perspective view of a first shutter blade assembly included in the shutter device of FIG. 2.
Figure 7:
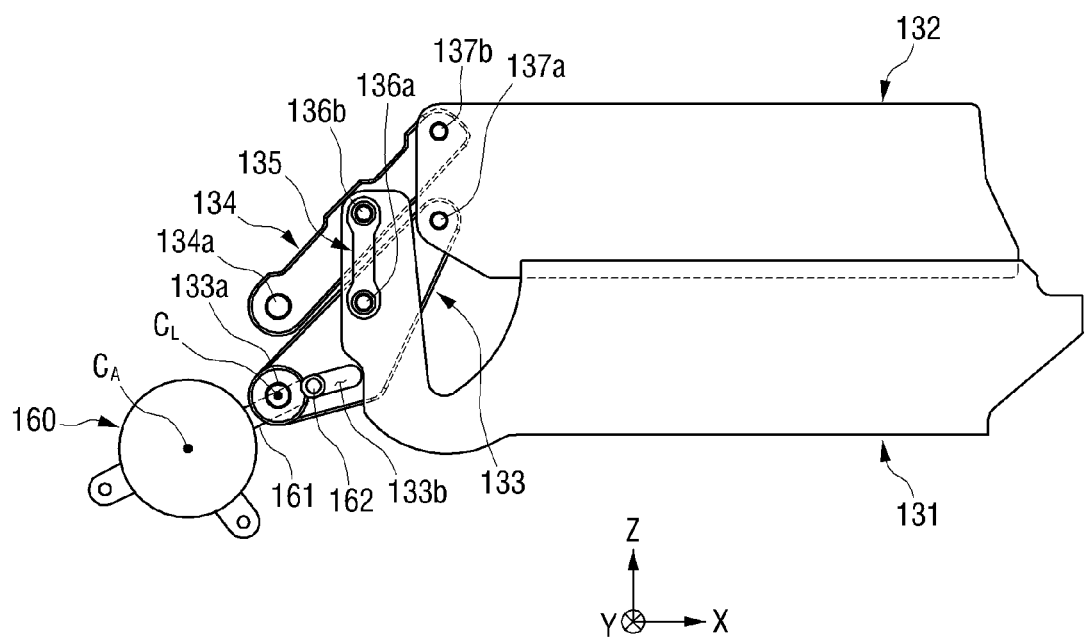
FIG. 7 is diagram illustrating a front view of a first shutter blade assembly included in the shutter device of FIG. 2 together with a first actuator.

FIG. 6 is an exploded perspective diagram illustrating the first shutter blade assembly 130, and FIG. 7 is diagram illustrating a front view of the first shutter blade assembly 130 together with the first actuator 160. Although the base frame 110 is actually disposed between the first shutter blade assembly 130 and the first actuator 160, the base frame 110 is omitted in FIG. 7, for clarity.

Referring to FIGS. 6 and 7, the first shutter blade assembly 130 may include a first shutter blade 131, a second shutter blade 132, a driving link 133, and a follower link 134.

The first shutter blade 131 and the second shutter blade 132 open and close the shutter opening 101 by moving along the shutter opening 101. The first shutter blade 131 and the second shutter blade 132 are relatively thin and are formed of materials having low translucency and flexibility. First and second coupling holes 131 a and 131 b are formed in one end of the first shutter blade 131 and first and second coupling holes 132a and 132b are formed in one end of the second shutter blade 132.

The driving link 133 transfers the rotary force of the first actuator 160 to the shutter blades 131 and 132 to cause the shutter blades 131 and 132 to make translation motions. A boss insertion hole 133a is formed in the driving link 133 and the first boss 114 (see FIG. 4) of the base frame 110 is inserted into the boss insertion hole 133a. Therefore, the driving link 133 can rotate on an axis of the first boss 114 and a rotation center $C_L$ of the driving link 133 coincides with a center of the boss insertion hole 133a.

A long hole shaped slot 133b is also formed in the driving link 133. As shown in FIG. 7, the actuator 160 includes a rotary lever 161, which is connected to a rotor (not shown) and rotates with the rotor. A driving protrusion 162, which protrudes in a Y-axis direction, is included in an end of the rotary lever 161. The driving protrusion 162 is inserted and coupled into the slot 133b of the driving link 133 so that the rotary force of the first actuator 160 can be transferred to the driving link 133. First and second coupling holes 133c and 133d for mounting the shutter blades 131 and 132 are formed in the driving link 133. The first coupling hole 133c is located closer to the rotation center $C_L$ of the driving link 133 than the second coupling hole 133d.

The follower link 134 is disposed substantially parallel to the driving link 133 and supports the shutter blades 131 and 132 together with the driving link 133. A boss insertion hole 134a is formed in the follower link 134. The second boss 115 (see FIG. 4) of the base frame 110 is inserted into the boss insertion hole 134a so that the follower link 134 rotates on axis of the second boss 115 of the base frame 110. In a different manner than the driving link 133, which directly receives the rotary force of the actuator 160, the follower link 134 receives the rotary force of the actuator 160 through the shutter blades 131 and 132. First and second coupling holes 134b and 134c for coupling with the shutter blades 131 and 132 are formed in the driving link 133. The first coupling hole 134b is disposed closer to the boss insertion hole 134a than the second coupling hole 134c.

The first shutter blade assembly 130 includes first to fourth pins 136a, 136b, 137a, and 137b for mounting the shutter blades 131 and 132 on the links 133 and 134. The first shutter blade 131 is mounted on the links 133 and 134 through the first and second pins 136a and 136b. More specifically, the first pin 136a is inserted into the first coupling hole 131a of the first shutter blade 131 and the first coupling hole 133c of the driving link 133 to couple the first shutter blade 131 to the driving link 133. The second pin 136b is inserted into the second coupling hole 131b of the first shutter blade 131 and the first coupling hole 134b of the follower link 134 to couple the first shutter blade 131 to the follower link 134. On the other hand, the second shutter blade 132 is mounted on the links 133 and 134 through the third and fourth pins 137a and 137b. More specifically, the third pin 137a is inserted into the first coupling hole 132a of the shutter blade 132 and the second coupling hole 133d of the driving link 133 to couple the second shutter blade 132 to the driving link 133. The fourth pin 137b is inserted into the second coupling hole 132b of the second shutter blade 132 and the second coupling hole 134c of the follower link 134 to couple the second shutter blade 132 to the follower link 134.

As described above, the follower link 134 does not directly receive the rotary force from the actuator 160, but receives the rotary force of the actuator 160 through the shutter blades 131 and 132. Therefore, the shutter blades 131 and 132 may primarily receive a bending moment according to function for the transfer of the rotary force. The bending deformation of the shutter blades 131 and 132 may occur according to the bending moment, and the resulting bending deformation may cause inaccurate operation of the shutter blades 131 and 132.

In order to prevent the bending deformation of the shutter blades 131 and 132, the first shutter blade assembly 130 further includes an assistant link 135. The assistant link 135 includes first and second coupling holes 135a and 135b and is mounted on through the first and second pins 136a and 136b used for mounting the first shutter 131. That is, the first pin 136a is inserted into the first coupling hole 135a of the assistant link 135 and the second pin 136b is inserted into the second coupling hole 135b of the assistant link 135 so that the assistant link 135 is mounted on the links 133 and 134 in the same manner as the first shutter blade 131. Therefore, pin coupling points of the assistant link 135 coincide with pin coupling points of the first shutter blade 131 as the first coupling hole 133c of the driving link 133 and the first coupling hole 134b of the follower link 134. According to another embodiment of the present invention, the assistant link 135 may be pin-coupled to pin coupling points of the second shutter blade 132, i.e., the second coupling hole 133d of the driving link 133 and the second coupling hole 134c of the follower link 134.

The assistant link 135 formed of a material much harder than the materials used to form the shutter blades 131 and 132. For example, the assistant link 135 may include stainless steel. Therefore, the follower link 134 can receive the rotary force of the actuator 160 through the hard assistant link 135 instead of the flexible shutter blades 131 and 132. Therefore, the bending deformation of the shutter blades 131 and 132 according to the transfer of the driving force can be prevented and thus, operation accuracy of the shutter blades 131 and 132 is improved.

As described above, the driving link 133 receives the rotary force from the actuator 160 through the driving protrusion 162 included in the rotary lever 161 of the actuator 160. Referring to FIG. 7, the rotation center of the rotary lever 161, that is, the rotation center $C_A$ of the actuator 160 does not coincide with the rotation center $C_L$ of the driving link 133. In other words, the rotation center $C_A$ of the actuator 160 is eccentric from the rotation center $C_L$ of the driving link 133. In a conventional mechanism, a rotation center of an actuator generally coincides with a rotation center of a driving link. However, according to this embodiment of the present invention, the actuator 160 is designed so that the rotation center $C_A$ of the actuator 160 is eccentric from the rotation center $C_L$ of the driving link 133, thereby increasing driving efficiency of the actuator 160.

Simulations have been performed in order to compare the driving efficiency of the actuator in the related art and the driving efficiency of the actuator 160 in this embodiment of the present invention. In the simulations, a displacement of the shutter blade in the Y-direction according to a time was measured while a constant torque was applied to the driving link through the actuator. Simulation results are described as follows with reference to FIGS. 8A and 8B.

Figure 8A:
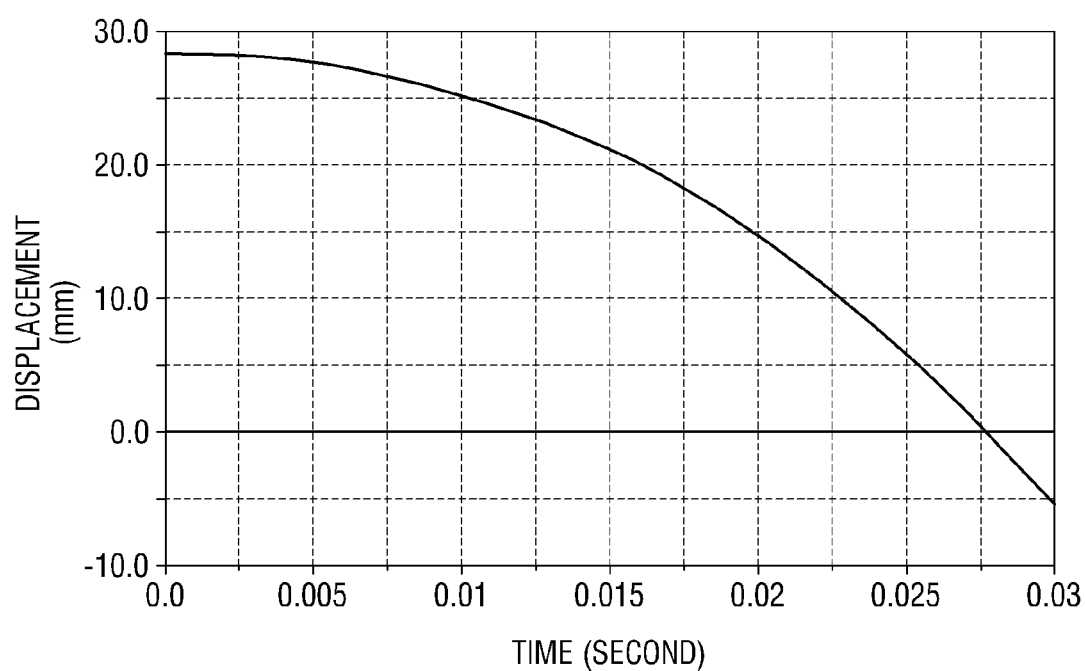
Figure 8B:
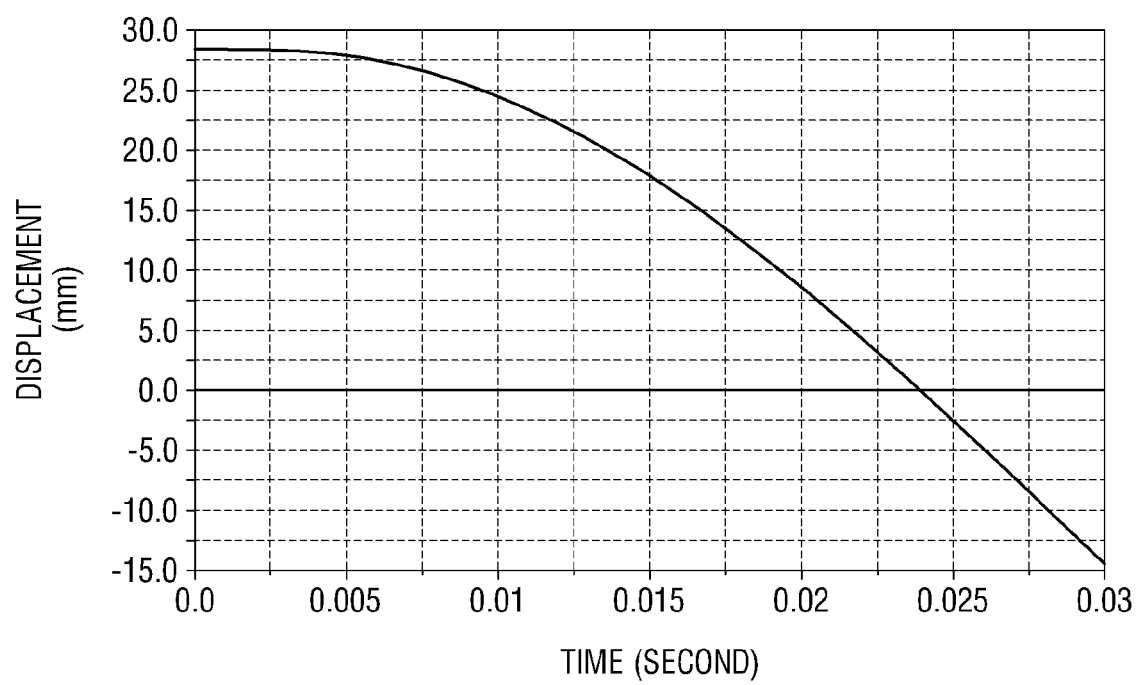

FIGS. 8A and 8B are graphs illustrating the simulation results for checking the driving efficiencies of the actuators. FIG. 8A is a graph showing results when the actuator in the related art is applied and FIG. 8B is a graph showing results when an actuator according to an embodiment of the present invention is applied. As shown in FIG. 8A, the shutter blade is shifted by about 34 mm in the Y-direction for 0.03 seconds in the related art. However, as shown in FIG. 8B, the shutter blade according to an embodiment of the present invention is shifted by about 43 mm in the Y-direction for 0.03 seconds.

Thus, as shown through these results, when the actuator in this embodiment of the present invention is applied, the distance of the shutter blade shifted for a constant time is greater than the shifting distance when the conventional actuator is used. The actuator generated a constant torque in the simulation, so that the required time is proportional to the required power. Therefore, according to embodiments of the present invention, using a long shifting distance of the shutter blade for the same time period enables a long shifting distance of the shutter blade to be obtained using the same power and thus, less power is consumed to obtain the same shifted distance of the shutter blade.

By comparison with conventional mechanisms in which the rotation center of the actuator is coincided with the rotation center of the driving link, shutter devices according to embodiments of the present invention, in which the rotation center $C_A$ of the actuator 160 is eccentric from the rotation center $C_L$ of the driving link 133, can reduce the power consumption required to drive the shutter blades. Therefore, the shutter device 100 of this embodiment of the present invention can obtain a greater shutter blade speed than a conventional using the same power. Therefore, according to embodiments of the present invention, the same shutter blade speed can be obtained using the actuator less power than required by a conventional actuator.

The foregoing embodiments of the present invention and the described advantages of these embodiments are merely provided as examples and are not to be construed as limiting the present invention. The present invention can be readily applied to other types of apparatuses. Also, the description of the embodiments of the present invention are illustrative, and do not limit the scope of the claims, and any alternatives, modifications, and variations, as will be apparent to those skilled in the art.

What is claimed is:

1. A shutter device comprising:
    a shutter opening for passing an incident light;
    at least one shutter blade assembly, each of the shutter blade assemblies including at least one shutter blade that opens and closes the shutter opening and a driving link that drives the shutter blades; and
    at least one actuator for rotating the driving link,
    wherein a rotation center of the actuator is eccentric from a rotation center of the driving link,
    wherein the at least one actuator includes a rotary lever that rotates together with a rotor included in the actuator,
    wherein the rotary lever includes a driving protrusion at one end of the rotary lever, and
    wherein the driving link includes a slot into which the driving protrusion is inserted.

2. The shutter device as claimed in claim 1, wherein each of the at least one shutter blade assembly further includes a follower link that supports the shutter blades together with the driving link, and an assistant link coupled between the driving link and the follower link.

3. The shutter device as claimed in claim 2, wherein the assistant link is formed of material having a hardness greater than a hardness of the shutter blades.

4. The shutter device as claimed in claim 2, wherein each of the at least one shutter blade assembly includes a first shutter blade and a second shutter blade, and
    wherein the first shutter blade and the second shutter blade are pin-coupled to the driving link and the follower link, respectively.

5. The shutter device as claimed in claim 4, wherein the assistant link is pin-coupled to the driving link and the follower link at the same points at which the first shutter blade is pin-coupled, respectively.

6. The shutter device as claimed in claim 4, wherein pin coupling points of the first shutter blade to the driving link and the follower link are disposed closer to rotation centers of the links than pin coupling points of the second shutter blade.

7. The shutter device as claimed in claim 1, wherein the shutter device comprises:
   a first shutter blade assembly including at least one front blade; and
   a second shutter blade assembly including at least one rear blade.

8. The shutter device as claimed in claim 1, wherein the shutter blades are translationally movable along the shutter opening.

9. The shutter device as claimed in claim 1, wherein the actuator is a voice coil motor actuator.

10. A shutter device comprising:
    a shutter opening for passing an incident light;
    at least one shutter blade assembly, each of the shutter blade assemblies including at least one shutter blade that opens and closes the shutter opening and a driving link that drives the shutter blades; and
    at least one actuator for rotating the driving link,
    wherein a rotation center of the actuator is eccentric from a rotation center of the driving link,
    wherein the shutter device comprises a first shutter blade assembly including at least one front blade, a second shutter blade assembly including at least one rear blade, and a separation plate that separates the first shutter blade assembly from the second shutter blade assembly, and
    wherein the separation plate is inclined relative to a plane in which the front blades and rear blades are disposed.

11. An image capturing apparatus comprising:
    an image pick-up device; and
    a shutter device having a shutter opening through which light passes toward the image pick-up device,
    wherein the shutter device includes at least one shutter blade assembly, each of the at least one shutter blade assembly including at least one shutter blades that opens and closes the shutter opening and a driving link that drives the shutter blades; and
    at least one actuator for rotating the driving link,
    wherein a rotation center of the actuator is eccentric from a rotation center of the driving link,
    wherein the at least one actuator includes a rotary lever that rotates together with a rotor included in the actuator,
    wherein the rotary lever includes a driving protrusion at one end of the rotary lever, and
    wherein the driving link includes a slot into which the driving protrusion is inserted.

12. The image capturing apparatus as claimed in claim 11, wherein each of the at least one shutter blade assembly further comprises:
    a follower link that supports the shutter blades together with the driving link; and
    an assistant link coupled between the driving link and the follower link.

13. The image capturing apparatus as claimed in claim 12, wherein the assistant link is formed of a material having a hardness greater than a hardness of the shutter blades.

14. The image capturing apparatus as claimed in claim 11, wherein the shutter device comprises:
    a first shutter blade assembly including at least one front blade; and
    a second shutter blade assembly including at least one rear blade.

15. An image capturing apparatus comprising:
    an image pick-up device; and
    a shutter device having a shutter opening through which light passes toward the image pick-up device,
    wherein the shutter device includes at least one shutter blade assembly, each of the at least one shutter blade assembly including at least one shutter blades that opens and closes the shutter opening and a driving link that drives the shutter blades, and at least one actuator for rotating the driving link,
    wherein a rotation center of the actuator is eccentric from a rotation center of the driving link,
    wherein the shutter device comprises a first shutter blade assembly including at least one front blade, a second shutter blade assembly including at least one rear blade, and a separation plate that separates the first shutter blade assembly from the second shutter blade assembly, and
    wherein the separation plate is inclined relative to a direction in which the shutter opening is disposed.

16. A shutter device comprising:
    a shutter opening through which incident light passes at least one shutter blade for opening and closing the shutter opening;
    a driving link, on which the at least one shutter blade is mounted, for driving the at least one shutter blade;
    a follower link, on which the at least one shutter blade is mounted, for supporting the at least shutter blade together with the driving link; and
    an assistant link separate from each of the at least one shutter blade and coupled between the driving link and the follower link.

17. The shutter device as claimed in claim 16, wherein the assistant link is formed of material having a hardness greater than a hardness of the at least one shutter blade.

18. A shutter device comprising:
    a shutter opening through which an incident light passes;
    a first shutter blade assembly including at least one front blade that opens and closes the shutter opening;
    a second shutter blade assembly including at least one rear blade that opens and closes the shutter opening; and
    a separation plate for separating the first shutter blade assembly from the second shutter blade assembly,
    wherein the separation plate is inclined relative to a plane in which the front blades and the rear blades are disposed.

* * * * *